J. WATZELHAN.
SETTING MECHANISM FOR AUTOMOBILE LAMPS.
APPLICATION FILED SEPT. 24, 1912.
1,068,191.
Patented July 22, 1913.
2 SHEETS—SHEET 2.
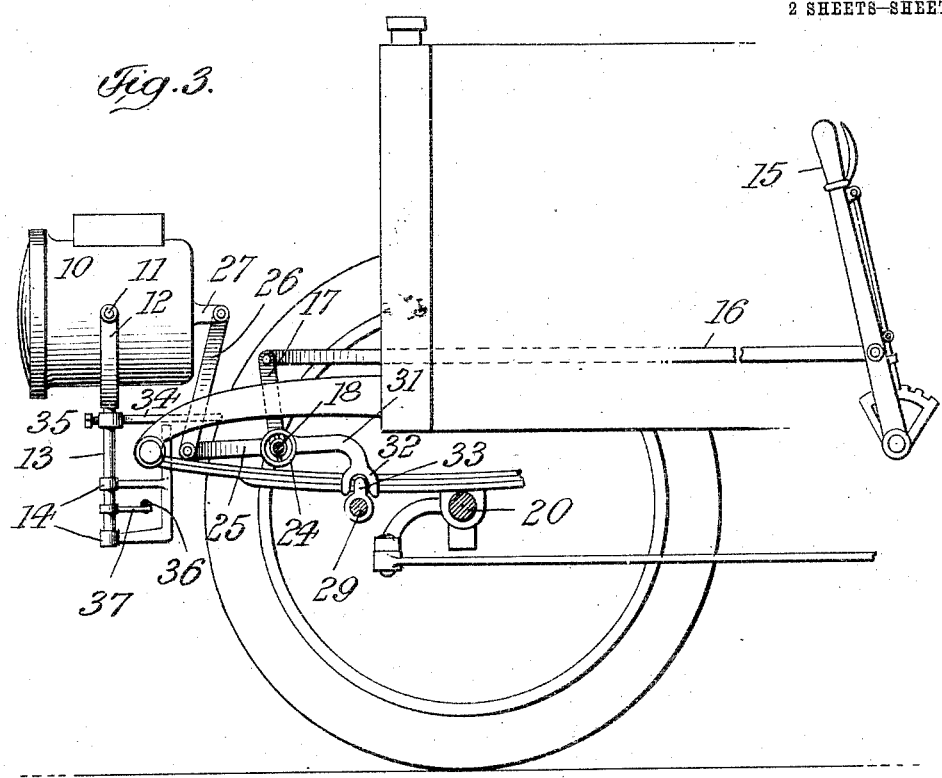
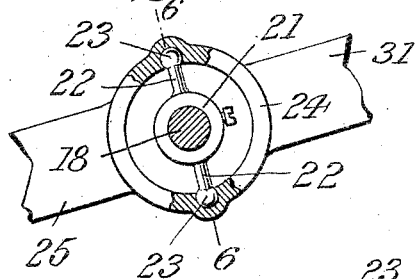
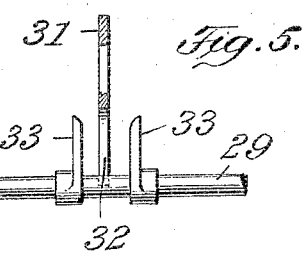
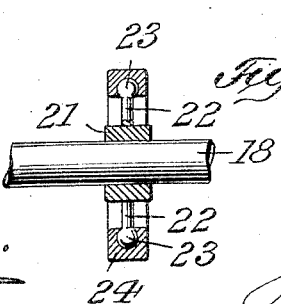
WITNESSES
INVENTOR
Joseph Watzelhan
BY
ATTORNEYS.

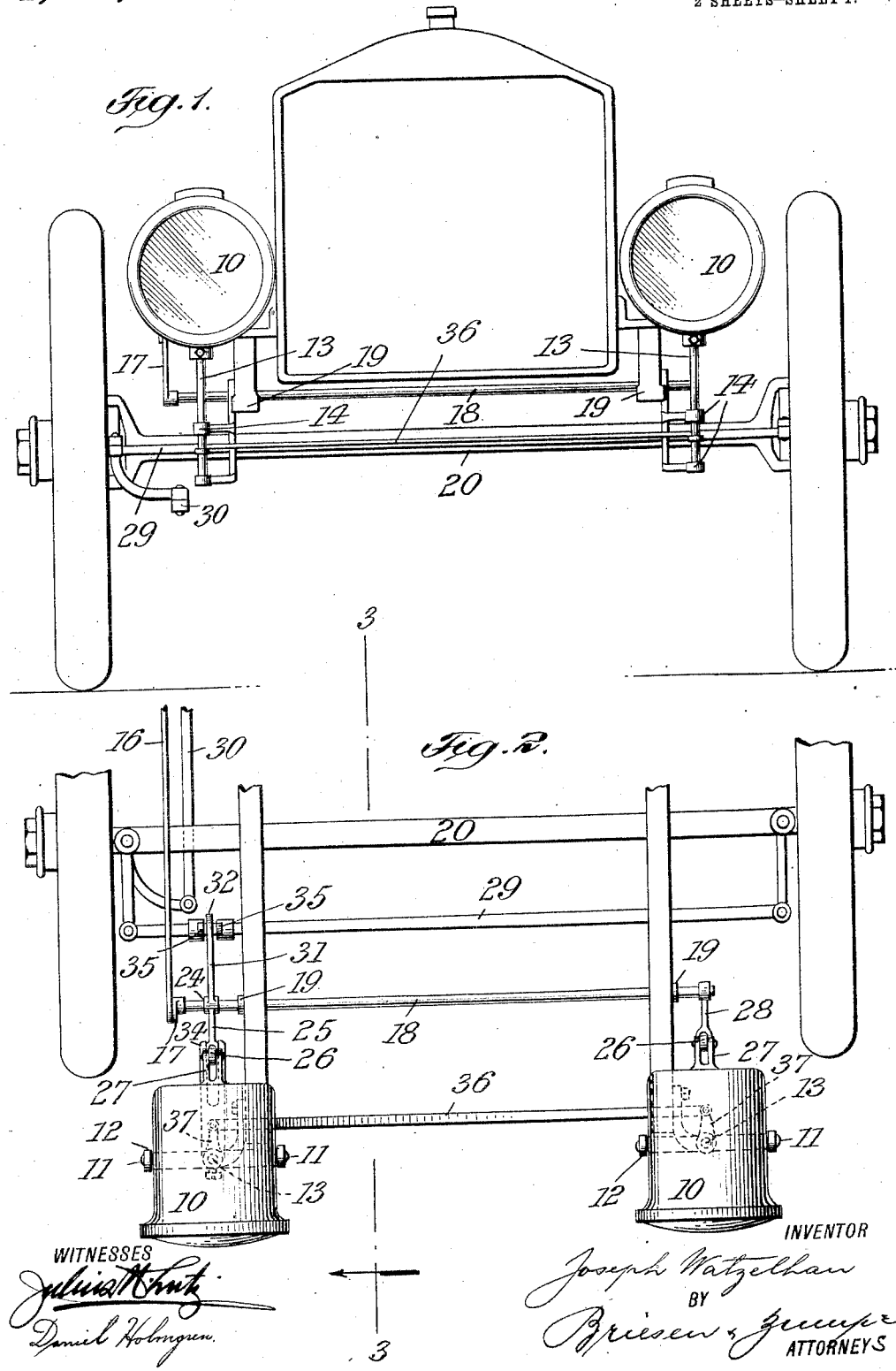

UNITED STATES PATENT OFFICE.

JOSEPH WATZELHAN, OF NEW YORK, N. Y.

SETTING MECHANISM FOR AUTOMOBILE-LAMPS.

1,068,191.     Specification of Letters Patent.     Patented July 22, 1913.

Application filed September 24, 1912. Serial No. 722,035.

*To all whom it may concern:*

Be it known that I, JOSEPH WATZELHAN, a citizen of the United States, residing at New York city, county and State of New York, have invented a new and Improved Setting Mechanism for Automobile-Lamps, of which the following is a specification.

This invention relates to an automobile headlight, which may be turned downward as well as sidewise in a novel and reliable manner, so that turns in the road may receive timely illumination.

In the accompanying drawing: Figure 1 is a front view of part of an automobile provided with my improved headlights; Fig. 2 a plan; Fig. 3 a section on line 3—3, Fig. 2; Fig. 4 a detail of the ball and socket joint; Fig. 5 a detail of the tappet-coupling, and Fig. 6 a section on line 6—6, Fig. 4.

The two headlights 10 of the car are hung at 11 in forks 12 having depending stems 13 which are rotatably mounted in bearings 14. Means are provided for tilting lamps 10 on their gudgeons 11 in vertical planes, so as to illuminate the roadbed at a greater or smaller distance from the machine. These means are shown to consist of a hand lever 15 which is by rod 16 connected to a crank 17 fast on a rock shaft 18 mounted in bearings 19 and extending in parallelism with car axle 20. Upon shaft 18 is fast near one end thereof, a collar 21 having a pair of diametrically opposed arms 22. These arms are provided with ball-shaped ends 23 engaging corresponding sockets formed in a ring 24. The latter is integral with a forwardly extending lever 25 which is by link 26 connected to a lug 27 extending rearwardly from one of the lamps 10. To the other end of shaft 18, is secured a lever 28 which is by its link 26 connected to the lug 27 of the other lamp. It will thus be seen that by throwing lever 15 backward, shaft 18 will be rocked and levers 25, 28 will be tilted to correspondingly tilt lamps 10 on their horizontal axes to illuminate the road directly in front of the car. It is of course obvious that the hand lever 15 may be replaced by any other actuating device that may be preferred.

Means are provided for causing the downwardly tilted lamps to be swung sidewise in unison with the corresponding movement of the front wheels of the machine, so that the lamps will timely light up the turns on cross roads and curves. These means are shown to be actuated by the steering link bar 29 that operatively connects the front wheels of the car and is operated by steering rod 30 as usual. For coupling the lamps 10 to said bar 29, ring 24 is provided with a rearwardly extending lever arm 31 having a claw 32. This claw is adapted to straddle bar 29 intermediate a pair of tappets 33 carried thereby. Thus when lever 15 is pulled back to tilt the lamps, arm 31 is lowered and its claw 32 is caused to fall in between the tappets 33. If now the steering rod 30 is operated to turn the machine, bar 29 will be shifted and one of its tappets 33 will cause arm 31 and consequently lever 25 to be swung sidewise on balls 23, which movement will be followed by the coöperating link 26. The latter is straddled by the forked rear end of a lever 34 secured to the stem 13 of one of the lamps by screw 35, so that in this way the lamp will be turned about its vertical axis to illuminate the path in front of the turning car. This movement of the operable lamp is transmitted to the other lamp by a rod 36 pivoted to cranks 37 that extend rearwardly from the stems 13 of the two lamps. It will thus be seen that the operator is required only to manipulate the tilting lever 15 prior to taking a curve, after which the lamps will be turned sidewise in conformity with the front wheels of the car, so that any additional manipulation for lighting up the road in advance of taking the turn is entirely obviated.

I claim:

1. A device of the character described, comprising a steering mechanism, an automobile lamp normally uncoupled therefrom, means controlled by the driver for tilting said lamp about its horizontal axis, and means for simultaneously coupling the lamp to said steering mechanism, whereby the tilted lamp is caused to turn sidewise in unison with the front car wheels.

2. A device of the character described, comprising an automobile lamp, a steering link bar, means for tilting said lamp about its horizontal axis, and means for simultaneously coupling the lamp to said bar.

3. A device of the character described, comprising an automobile lamp; a fork in which said lamp is hung so as to turn about its horizontal axis, a rotatably supported stem depending from the fork, means for tilting the lamp within the fork, a steering rod, and means for simultaneously connecting the stem operatively to said rod.

4. A device of the character described, comprising an automobile lamp adapted to turn about its horizontal and vertical axes, a vertically oscillable and laterally movable lever, means for connecting said lever at its forward end to the lamp, a steering link bar, and means for coupling the rear end of said lever to said bar.

5. A device of the character described, comprising an automobile lamp adapted to turn about its horizontal and vertical axes, a vertically oscillable and laterally movable lever, a link-connection between the front end of said lever and the lamp, and a steering link bar having a pair of tappets adapted to be engaged by the rear end of said lever.

6. A device of the character described, comprising an automobile lamp, a fork in which said lamp is hung, a rotatably supported stem depending from the fork, a vertically oscillable and laterally movable lever, means for connecting the front end of said lever to said lamp and also to said stem, a steering link bar, and means for coupling the rear end of said lever to said bar.

7. A device of the character described, comprising an automobile lamp adapted to turn about its horizontal and vertical axes, a rock shaft, means for operating the same, a lever mounted on the rock shaft so as to be vertically oscillable and laterally movable thereon, means for connecting the front end of said lever to the lamp, a steering link bar, and means for coupling the rear end of said lever to said bar.

8. A device of the character described, comprising an automobile lamp adapted to turn on its horizontal and vertical axes, a rock shaft, means for operating the same, a lever, a ball and socket joint intermediate shaft and lever, means for connecting the front end of said lever to the lamp, a steering link bar, and means for coupling the rear end of said lever to said bar.

9. A device of the character described, comprising an automobile lamp adapted to turn on its horizontal and vertical axes, a rock shaft, a pair of arms extending therefrom and having ball-shaped ends, a socketed-ring engaged thereby, a lever carrying said ring, means for connecting the front end of said lever to the lamp, a steering link bar, and means for coupling the rear end of said lever to said bar.

10. A device of the character described, comprising a pair of automobile lamps adapted to turn on their horizontal and vertical axes, means for operatively connecting said lamps to each other, a steering rod, means for tilting said lamps on their horizontal axes, and means for simultaneously connecting said lamps operatively to said rod, so as to turn said lamps sidewise in unison with the front car wheels.

JOSEPH WATZELHAN.

Witnesses:
 ARTHUR E. ZUMPE,
 KATHERYNE KOCH.